(12) United States Patent
Gradov et al.

(10) Patent No.: US 10,428,277 B2
(45) Date of Patent: Oct. 1, 2019

(54) DEVICE FOR PROCESSING SCRAP RUBBER

(71) Applicant: OOO "Nauchno-Proizvodstvennoe Obedinenie Innovatekh", St. Petersburg (RU)

(72) Inventors: Aleksei S. Gradov, St. Petersburg (RU); Evgeny S. Susekov, St. Petersburg (RU); Sergei P. Susekov, Leningradskaya Obl. (RU)

(73) Assignee: OOO "Nauchno-Proizvodstvennoe Obedinenie Innovatekh", St. Petersburg (RU)

( * ) Notice: Subject to any disclaimer, the term of this patent is extended or adjusted under 35 U.S.C. 154(b) by 0 days.

(21) Appl. No.: 16/412,610

(22) Filed: May 15, 2019

(65) Prior Publication Data

US 2019/0264109 A1 Aug. 29, 2019

Related U.S. Application Data

(63) Continuation of application No. PCT/RU2017/000832, filed on Nov. 7, 2017.

(30) Foreign Application Priority Data

Nov. 28, 2016 (RU) .................................. 2016146652

(51) Int. Cl.
*C10G 1/10* (2006.01)
*C08J 11/20* (2006.01)
(Continued)

(52) U.S. Cl.
CPC ................ *C10G 1/10* (2013.01); *B29B 17/02* (2013.01); *C08J 11/20* (2013.01); *C10B 53/07* (2013.01);
(Continued)

(58) Field of Classification Search
CPC .. C10G 1/10; C10G 2300/1003; B29B 17/00; C08J 11/10
(Continued)

(56) References Cited

U.S. PATENT DOCUMENTS 5,057,189 A 10/1991 Apffel
5,856,599 A * 1/1999 Kuroki ...................... C10G 1/10
585/241
2016/0045841 A1 2/2016 Kaplan et al.

FOREIGN PATENT DOCUMENTS

BY 13279 C1 6/2010
EP 1201389 B1 7/2009
(Continued)

OTHER PUBLICATIONS

International Search Report from PCT/RU2017/000832, filed Nov. 7, 2017, dated Feb. 21, 2018.
(Continued)

*Primary Examiner* — Thuan D Dang
(74) *Attorney, Agent, or Firm* — Patentbar International, P.C.

(57) ABSTRACT

A device for processing scrap rubber has a reactor with a screw conveyor disposed inside a heating chamber, a thermal decomposition unit, burners, a condenser, a cyclone filter, and devices for discharging solid residue and removing a gas-vapor mixture. The reactor has two sections connected in parallel. The thermal decomposition unit has screw conveyors in each section, the conveyors have axial heating pipes with a coil. Along the length of the conveyors plates are arranged at the corners of an equilateral triangle in contact with and perpendicular to the side surface of the heating tube. A cylinder furnace with an evaporator and a burner is connected to the ends of the pipes. An outlet of the condenser is connected to a liquid fraction separator, inlets
(Continued)

of the coils are connected to an outlet of the evaporator, and an inlet of the evaporator is connected to an outlet from the separator.

1 Claim, 3 Drawing Sheets

(51) Int. Cl.
*C10B 53/07* (2006.01)
*B29B 17/02* (2006.01)

(52) U.S. Cl.
CPC ............... *B29B 2017/0272* (2013.01); *C10G 2300/1003* (2013.01)

(58) Field of Classification Search
USPC ......................................................... 585/241
See application file for complete search history.

(56) References Cited

FOREIGN PATENT DOCUMENTS

| RU | 2245247 C2 | 1/2005 |
| RU | 2441053 C2 | 1/2012 |
| RU | 2459843 C1 | 8/2012 |
| RU | 2460743 C2 | 9/2012 |

OTHER PUBLICATIONS

Isachenko et al, Heat Transfer, College textbook—4th edition, 1981, pp. 405-406, Table 9, Engergoizdat, Moscow.

\* cited by examiner

DEVICE FOR PROCESSING SCRAP RUBBER

RELATED APPLICATIONS

This Application is a Continuation application of International Application PCT/RU2017/000832, filed on Nov. 7, 2017, which in turn claims priority to Russian Patent Application RU2016146652, filed Nov. 28, 2016, both of which are incorporated herein by reference in their entirety.

FIELD OF THE INVENTION

The invention relates to waste recycling technologies and may be applied in the rubber industry, chemical industry, fuel and energy sector, and in the housing and public utility sector to produce fuel and raw material resources from waste.

BACKGROUND OF THE INVENTION

There is a known process and plant for rubber-containing waste recycling (RU Patent No. 2460743, IPC C08J11/20, published 10 Sep. 2012).

The plant for processing rubber-containing waste comprises a reactor, a filter, heat exchange equipment, and separation equipment. The reactor consists of two sections: crumb rubber thermolysis section and carbon black marketable conditioning section; both sections are united with a common filter arranged between the sections, and with a spiral solid product propulsive conveyor arranged inside the reactor, with a rotating spiral used as the propulsion unit, or with both sections used independent of each other, each provided with its own filter and spiral.

The plant uses a stainless wire gauze filter with short-pulse washing with gas produced in the thermolysis process, by compressing it in a compressor to separate condensate of heat transfer agent, a synthetic crude component.

The drawbacks of the said device include:
1. Incomplete extraction of liquid fraction (oil) from the gas flow, as a result losing some valuable liquid products. This is caused by air-washing the produced carbon black with adsorbed oil, the cord fabric being completely burnt, some of the oils burnt, and some carried away with flue gases.
2. Low quality of carbon black due to oil adsorption, so that to remove some of the oil, carbon black is air-washed; as a result, the carbon surface oxidizes and its quality deteriorates.
3. High energy consumption of the process dictated by the necessity to use a circulating heat transfer agent, which has to be separated from hydrocarbon vapors generated in thermal decomposition of rubber, then to be heated in a heat exchanger, evaporated, and superheated in a furnace prior to feeding to the reactor.

There is a known pyrolysis furnace (RU Patent No. 2441053, IPCK F23G5/027, C10B 53/00, published 27 Jan. 2012).

The furnace comprises a bin, a screw press, a heating chamber with pyrolysis gas burners, where a flow damper is arranged inside the screw casing at an angle to the feedstock movement direction, and where pyrolysis screw conveyors with their flow dampers are installed above this screw against the feedstock movement, as a rule more than one, each screw conveyor generally being driven from one motor with a reduction gear, the upper screw conveyors having pipes connected to them for removal of pyrolysis gas for value-added use and operation of the heating chamber burners, and the lower screw conveyor for feedstock charging having openings for steam escape to the heating chamber, where the heating chamber has water boiler pipes on its side walls and under the roof to utilize heat from the burners.

The drawbacks of the said furnace are:
1. Incomplete extraction of the liquid fraction (oil) from the gas flow, resulting in the loss (burning in the heating chamber burners) of a part of valuable liquid products, with high pollutant emission to the environment due to inability to provide complete burning of pyrolysis gases with a high resin content in the heating chamber burners.
2. Low quality of solid pyrolysis products due to residual hydrocarbons (volatile products), which cannot be separated in the process of drying, therefore additional thermal treatment of the said products is necessary at a high temperature of about 800° C.
3. High energy consumption of the process due to heat losses in the process and the need to increase the temperature in the furnace to 800° C.

There is a known method and device for steam thermal processing of rubber waste (Patent BY13279, IPC C08J11/00, C10B53/07, published 2010 Jun. 30).

The device comprises a heating chamber housing a reactor consisting of two equal parts contained in a jacket and arranged in a vertical plane horizontally one above the other and connected in series for pouring waste from the upper to the lower part, each part being provided with a screw and a vapor superheater a vapor superheater in the form of a coil pipeline wound along the length of the jacket, whose inlet is connected to the superheater and whose outlet is connected to the jacket at the inlet of the reactor's upper part, with the heating chamber being connected on the waste loading side to the outlet of the fuel burning chamber, the chamber's outlet being connected to the steam generator; the reactor's upper part is connected with a pipe to the waste loading screw provided with a bin with a water sluice gate, and connected with a pipeline to three condensers connected in series, where the flammable gas outlet from the third condenser is connected to the fuel burning chamber, and the reactor's lower part is connected with a pipe to the discharge bin with a water sluice gate, connected to which with its inlet is the discharge screw, whose outlet is connected to the inlet of a drum dryer, whose inlet is connected with a pipeline to the outlet of combustion products from the steam generator, and whose outlet is connected in series to the solid products discharge screw and the combustion product gas cleaning filter connected to a flue gas stack.

The drawbacks of the said device are:
1. Incomplete extraction by the condensers of the liquid fraction (oil) from the gaseous products of worn tires pyrolysis, resulting in the loss (burning in the burning chamber) of a part of a valuable component of the liquid fraction, and liquid fraction contamination by fine dust generated during solid product disintegration in the screws' operation and is carried away from the reactor with a flow of gaseous decomposition products to a condensation system.
2. Low quality of solid worn tire pyrolysis products due to residual hydrocarbons (volatile products), which cannot be separated in the process of drying, therefore additional thermal treatment of the said products is necessary at a high temperature of about 600-800° C.
3. High energy consumption of the process due to large heat losses during the tire pyrolysis in the reactor, and heat losses in the condensers (heat taken away with cooling water).

The closest to the present invention is the method is the method of thermoplastic waste processing and the plant for its implementation taken as prior art (RU Patent No. 2459843, IPC C08J11/04 (2006.01), published 27 Aug. 2012).

The thermoplastic waste processing plant comprises a waste pre-treatment assembly, an assembly for thermal decomposition of the products into a vapor-gas mix and solid residue, and a vapor-gas mix fractionation system. The thermal decomposition assembly comprises a reactor inclined at an angle to the horizon, arranged in the heating chamber with burners for gaseous fuel and a gas duct for removal of gaseous fuel combustion products, and provided with devices for solid residue discharge and vapor-gas mix removal, where a screw is arranged inside the reactor whose drive is installed outside the reactor, and the vapor-gas mix removal device consists of a gas duct provided with a heating jacket with shutoff valves installed on it, whose inlet is connected to the gas duct for extraction of the reactor's heating chamber gaseous fuel combustion products and whose outlet is connected to the feeder's heating jacket, the vapor-gas mix extraction device being connected to the vapor-gas mix fractionation system, which contains two air cooling condensers installed in series, with air supply and exhaust pipes, and a cyclone filter connected with gas ducts to gaseous fuel burners of the reactors heating chamber.

The drawbacks of the said device are:

1. Incomplete extraction of waste pyrolysis gaseous products by the liquid fraction fractionation system, resulting in the loss of a part of a valuable component of the light fraction, and liquid fraction contamination by fine dust generated during solid product disintegration in the screws' operation and is carried away from the reactor with a flow of gaseous decomposition products to a condensation system.

2. Low quality of solid waste pyrolysis products due to residual hydrocarbons (volatile products), which cannot be separated in the process of drying, therefore additional thermal treatment of the said products is necessary at a high temperature of about 600-800° C.

3. High energy consumption of the process due to large heat losses during the waste pyrolysis in the reactor, and heat losses in the condensers (heat taken away with cooling water).

SUMMARY OF THE INVENTION

The object of the present invention is to improve the quality of products made from rubber waste, and to reduce the energy consumption of the recycling process.

The said goal is achieved by providing a rubber waste processing device comprising a reactor having a screw and arranged in a heating chamber, a thermal decomposition assembly, burners, a condenser, a cyclone filter, and devices for solid residue discharge and vapor-gas mixture extraction, where according to the invention the reactor is designed as two similar sections arranged in a horizontal plane and connected in parallel on a side surface, and the thermal decomposition assembly consists of screws with heating pipes installed along each screw's axis, the screws being arranged in each section of the reactor, with plates installed along the full length of each screw in parallel at the angles of an equilateral triangle in contact and perpendicular to the side surface of the heating pipe, where a pipe coil is installed inside each heating pipe, with a cylindrical furnace directly connected to one end of each pipe, which furnace is provided with an evaporator and a burner installed at the furnace's end tangentially to the furnace's side surface and perpendicular to its axis, with the condenser's outlet connected to a separator to separate liquids into hydrocarbons and water, and the inlet of each pipe coil connected to the evaporator's outlet, the evaporator's inlet is connected to the water outlet from the separator, and each coil's outlet is connected to the reactor, with the other end of each heating pipe connected to the heating chamber's inlet; the vapor-gas mixture extractor consists of two perforated pipes with a plugged inlet arranged in the reactor's top part, one in each of its components; the cyclone filter is provided with a heating jacket, whose inlet is connected to the heating chamber's outlet, while the heating jacket's outlet is connected to a calorifer's inlet, the calorifer's outlet being connected to a flue gas stack, the inlet of the calorifer's heating chamber being connected to the atmosphere, and the outlet of the calorifer's heating chamber being connected to the heating pipe, the outlets of the perforated pipes being connected to the cyclone filter's inlets, with a filtering element in the form of a heat-resistant carbon cloth bag provided with a shaker, while the cyclone filter's outlet is connected to the heating pipes, and the solid residue discharger is connected to the inlet of a magnetic separator, whose outlet is connected to an electrostatic separator.

A reactor designed as two similar sections arranged in a horizontal plane and connected in parallel on a side surface ensures a reduction of heat losses, while increasing the reactor's output. If the reactor is designed as two sections isolated from each other, the heat losses will be higher than with the sections connected in parallel on a side surface. The reduction of heat losses ensures a lower energy consumption for the waste recycling process.

A thermal decomposition assembly designed as screws with pipes installed along each one's axis and arranged in each section of the reactor ensures efficient thermal decomposition of vapors of high-molecular hydrocarbons generated in the rubber waste thermolysis into components of a lower molecular weight. Thermal energy is spent for the process of hydrocarbons thermal decomposition, which has to be transferred to the hydrocarbon vapors.

In our case, the thermal decomposition efficiency (less time for the decomposition process) is achieved by hydrocarbon vapors evolving from waste move up from the waste surface and flow around the pipes heated to a high temperature that are arranged directly (closely) above the waste surface. As a result of vapor heating by convective heat exchange with the pipes' surface and by emission, high-molecular hydrocarbons are thermally decomposed first of all (high-molecular hydrocarbons are thermally less persistent than low-molecular ones) producing more valuable (lighter) hydrocarbons. Thus, the quality of liquid products of rubber waste thermolysis is improved. Thermal decomposition of high-molecular hydrocarbons leads to their much smaller proportion in the vapor-gas mix that is extracted to the condensation system. Otherwise (with a significant content of high-molecular hydrocarbons in the vapor-gas mix), resins will deposit (condensation from vapor-gas mix) on the pipeline walls and heat-exchange surface of the condenser all along the mix flow, when flowing in the pipelines and entering the condensation system. This effect may causes pipeline fouling with resins and condenser failure.

In the process of thermal decomposition of high-molecular hydrocarbons, a soot layer will inevitable appear on pipe walls, which reduces heat transfer from the pipes to waste. The soot layer growing on the pipe surface creates a heat insulation jacket, so that the pipes burn through due to overheating, and the reactor fails. For continuous removal of the soot layer from the pipe surface, plates are installed along the full length of each screw parallel to each other, at the angles of an equilateral triangle in contact and perpendicular to the side surface of each pipe of the screw.

When the screw rotates, the plates slide on the pipes' side surfaces and cut off the generated soot, which falls down by gravity to the surface of waste moved by the screws.

Soot generated from hydrocarbon vapors virtually does not contain ash inclusions in the form of mineral components, because hydrocarbon vapors contain no mineral impurities (oxides of silicon, iron, zinc etc.) When such soot mixes with solid residue, the content of mineral impurities in the mix decreases, and as a result the solid product quality improves (the ash content decreases, and the specific area increases). A pipe coil installed inside each pipe enables adjustment of the pipe surface temperature, thus adjusting the rate and quantity of soot formed on the pipe surface. Such adjustment is provided by changing the flow rate of water vapor pumped through the coil. Simultaneously, water vapor is superheated to a preset temperature and supplied via the coil to the reactor as working steam.

To enable the rubber waste recycling process, thermal energy must be supplied to the reactor. A cylindrical furnace connected to the end of each pipe of a screw enables transferring thermal energy via the pipe directly to the reactor.

For full combustion of fuel, the furnace is provided with a burner installed at the furnace's end tangentially to the furnace's side surface and perpendicular to its axis, which helps setting up vortex combustion in the furnace when fuel is burnt up completely, thus reducing energy consumption for the waste recycling process. The combustion products from the furnace flow down the pipe for some time; as a result, fuel is burnt up completely, and noxious substances are decomposed.

An evaporator provided on the furnace enables generating working steam without using a special steam generator, cooling the furnace walls to prevent their burning out, and reducing the heat losses to the environment, since heat is transferred to the evaporator through the furnace's side walls, and not emitted to the environment, i.e. the evaporator in this case plays the role of effective heat insulation of the furnace (effective because the heat is utilized for getting working steam), which reduces the energy consumption for the waste recycling process.

Water must be continuously supplied to the evaporator for producing working steam. Therefore, the evaporator's inlet is connected to the water outlet from the separator where liquid products are separated into water and liquid hydrocarbons. Water separated in the separator forms in the condenser as a result of working steam condensation, and contains no salts. This water is used in a closed circuit, which greatly reduces the use of water from other sources and the water consumption for the waste recycling process.

Connecting each pipe coil with its inlet to the evaporator's outlet ensures supply of water vapor to the coil and vapor flowing in the coil under the overpressure created in the evaporator due to heating.

To supply water vapor to the reactor, each coil's outlet is connected to the reactor.

The important point is that the outgoing superheated water vapor from the coil flows around the screw pipes' surface and contacts the soot generated on the surface. Since the soot on the surface has a temperature of about 700-800° C., its contact with water vapor leads to a reaction of water vapor decomposition forming hydrogen and carbon oxide. The forming hydrogen at the high temperature in the reactor mixes with hydrocarbon vapors; as a result, reaction of hydrogenation proceed, i.e. decrease of the unsaturated compounds content in the vapor-gas mix, improving the quality of the forming liquid hydrocarbons.

The fuel combustion products flowing in the pipes leave the pipes at a high temperature (not lower than the temperature in the reactor, i.e. about 500-6000 C), therefore to improve the equipment's energy efficiency and to reduce the energy consumption for the recycling process, these products are not dumped to the atmosphere but directed to the heating chamber, which is achieved by connecting the end (outlet) of each screw pipe to the heating chamber.

A vapor-gas mix extraction device designed as two perforated pipes with a plugged inlet arranged in the upper part of the reactor, one in each of its components and their connection to the cyclone filter's inlet, with a filtering element in the form of a heat-resistant carbon cloth bag provided with a shaker, ensures extraction of vapor-gas products from the reactor and their cleaning free of fine soot (carbon) particles, which are generated due to the screw rotation and solid residue disintegration, and due to cutting soot off the pipe surface. In doing so, large particles of solid reside do not pass through the pipe perforation. Perforation of the pipe surface increases the overall cross-section, through which vapor-gas mix is extracted from the reactor, and reduces the gas flow rate on the pipe surface, i.e. reduces the number of solid particles carried out of the reactor.

Since the vapor-gas mix has a high temperature (400-500° C.), a heat-resistant carbon cloth bag is installed in the cyclone filter as its filtering element. Thus, the vapor-gas mix filtering at a high temperature prevents deposition of hydrocarbon vapor condensate on the filtering element and its clogging. Since deposition of particles on the carbon cloth surface creates resistance to the vapor-gas mix flow through the cyclone filter, the filtering element shall be regularly (1 to 3 times a minute) shaken with the shaker, dumping the soot into the filter storage.

Providing the filter with a heating jacket whose inlet is connected to the outlet of the reactor's heating chamber maintains a high temperature of the cyclone filter (higher than the hydrocarbon vapor condensation temperature) in order to prevent their condensation in the cyclone filter itself and vapor condensate deposition on the carbon cloth surface.

Combustion products leaving the heating jacket have a high temperature, therefore the outlet of the cyclone filter heating jacket is connected to the calorifer's inlet, which enables cooling the combustion products to a temperature of 200-250° C., after which they are directed to the flue gas stack. In doing so, the heat from combustion product cooling heats the air, which is pumped through the calorifer's heating chamber with a ventilator and supplied to the heating pipes. Supplying air heated to 150-250° C. to the heating pipes for burning non-condensable hydrocarbon vapors enables beneficial use of heat, and reduces the energy consumption for the rubber waste recycling process. In this case, the combustion temperature in the heating pipes also increases, which reduces the emission of persistent pollutants to the atmosphere.

Connecting the outlet of the cyclone filter to the condenser's inlet enables supplying vapor-gas mix cleaned free of solid particles to the condenser for its cooling and for condensation of water vapors and hydrocarbon vapors.

Some of the hydrocarbon vapors having a low boiling point (below 100° C.) are not condensed in the condenser. To prevent emission of non-condensable hydrocarbon vapors to the environment, the condenser's gas outlet is connected to the heating pipes. Thus, non-condensable hydrocarbon vapors are supplied to the heating pipes and burnt, which enables beneficial use of the vapor energy and a reduction of the liquid fuel consumption for the recycling process.

The solid residue generated in the rubber waste processing has a high ash content (about 12-14% wt., depending on the rubber waste type) and therefore cannot be used for the manufacturing of critical rubber articles. Therefore, the solid residue discharger is connected to a magnetic separator and a corona-type electrostatic separator where ash is separated from solid residue. This improves the solid residue's quality. The separated ash contains a large amount of zinc oxide (depending on the rubber type, this content may reach 30-40%, which is much higher than the content of zinc oxides in concentrates used for its production), therefore it's a valuable raw material for zinc oxide production.

Thus, connection of a corona-type electrostatic separator enables not only to improve the quality figures for solid products of rubber waste recycling, but also to get valuable raw material for zinc oxide production.

DETAILED DESCRIPTION OF THE PREFERRED EMBODIMENTS

Figure 1:
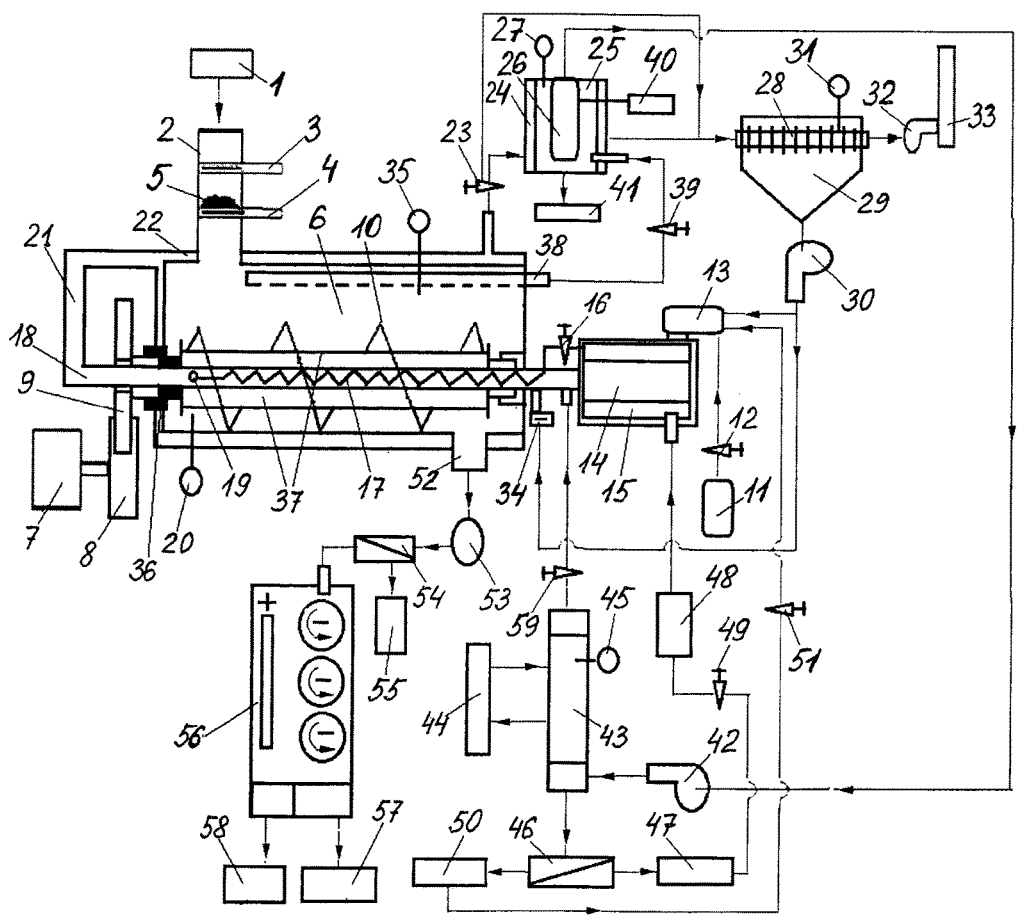
FIG. 1 is a schematic illustration of a rubber waste recycling device.
Figure 2:
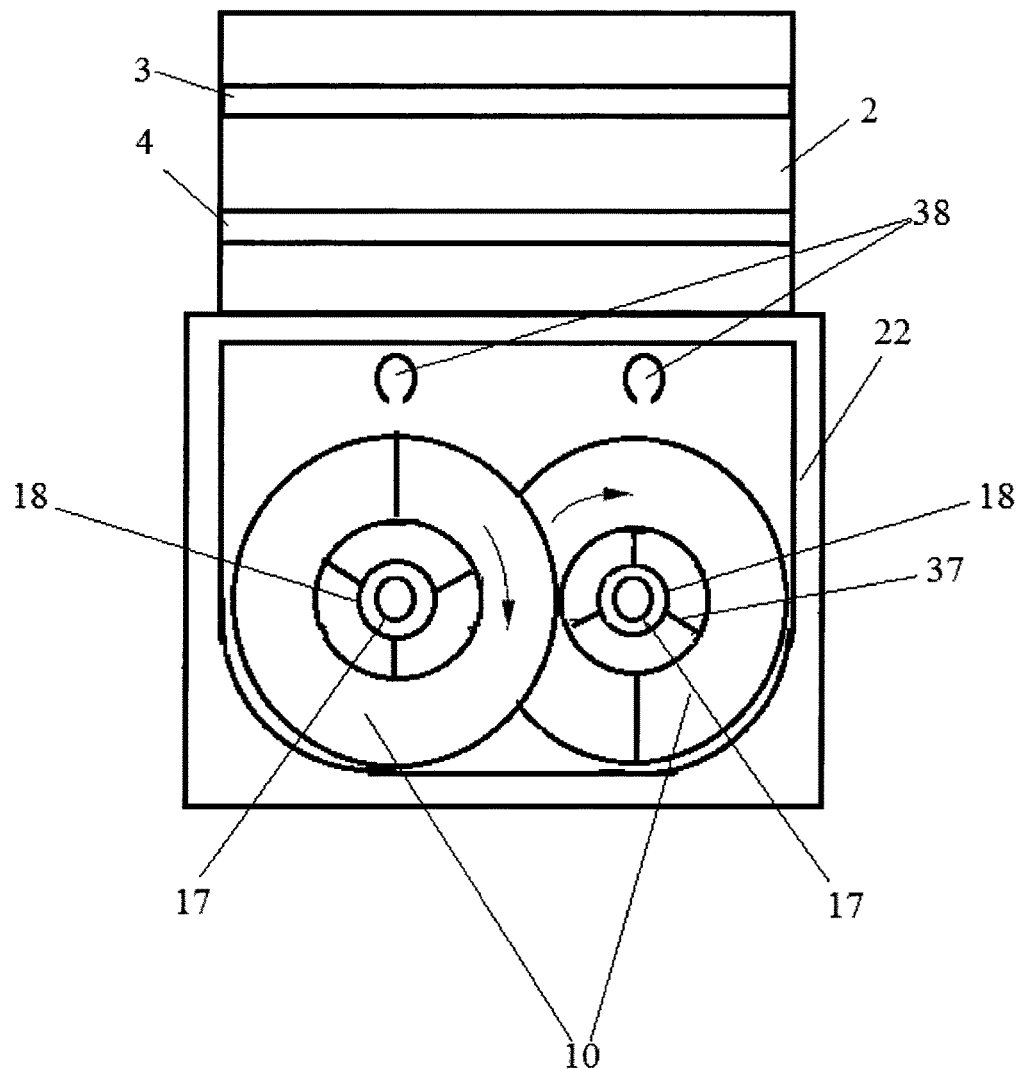
FIG. 2 is a schematic illustration of a detail of a rubber waste recycling device.
Figure 3:
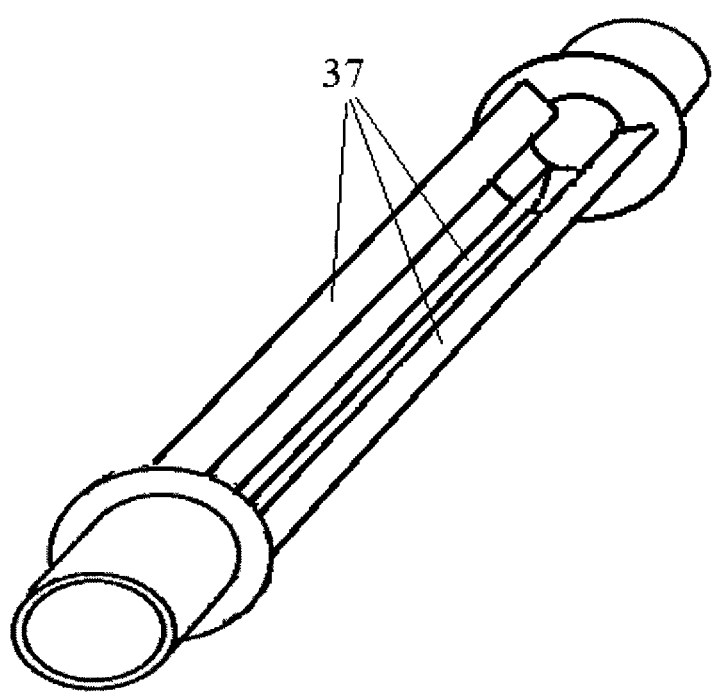
FIG. 3 is a schematic illustration of a detail of a rubber waste recycling device.

The device comprises storage 1 connected to bin 2 with gates 3 and 4 for feeding waste 5; reactor 6; motor 7 connected to gear 8, which is connected to gear 9; screws 10; tank 11 connected to adjusting valve 12; burners 13; cylindrical furnaces 14 with evaporators 15; valves 16 connected to pipe coils 17 installed in heating pipes 18; steam outlets 19; temperature sensors 20; pipeline 21; reactor's heating jacket 22; valve 23; filter jacket 24; cyclone filter 25 with filtering element 26; temperature sensor 27; calorifer 28 with heating chamber 29; ventilator 30; temperature sensor 31; exhauster fan 32 connected to flue gas stack 33; damper 34; temperature sensor 35; high-temperature seal 36; scrapers 37; perforated pipes 38; valve 39; shaker 40; storage 41; compressor 42; condenser 43; cooling tower 44; temperature sensor 45; separator 46; storage 47; water filter 48; valve 49; storage 50; valve 51; carbon residue outlet 52; cooling batcher 53; magnetic separator 54; storage 55; electrostatic separator 56; storages 57 and 58; valve 59.

According to the invention, the device operates as follows.

Shredded rubber waste 5 in the form of chips is fed from storage 1 to bin 2 with gates 3 and 4 closed. When bin 2 has been filled, gate 3 is opened, and waste from bin 2 pours down and is checked by gate 4. After this, gate 3 is closed, gate 4 is opened, and waste pours down to reactor 6. Next, gate 4 is closed. Simultaneously, with the aid of motor 7 gear 8 is set in rotation, which is engaged by gear 8 engaged by gear 9, which is connected to first screw 10 and engaged with the gear of the second screw. Such connection of the gears, with gear 8 in rotation, results in the screws' rotation towards each other. In doing so, the waste is transferred from loading to discharge. The screws rotating towards each other intensely stir the waste and move it, so that heat transfer to the waste intensifies (grows).

The time of the waste's travel in the reactor is adjusted by changing the speed of motor 7. Simultaneous with the start of the waste's relocation from tank 11 via adjusting valves 12 to burners 13 (FIG. 1 shows one burner), fuel is fed in and burnt. Burners 13 are installed in cylindrical furnaces 14, and a combustion product vortex with a high temperature is formed during the fuel burning. As a result, the fuel burns up completely, and the generation of noxious compounds (benz (a)pyrenes etc.) in combustion products is reduced. Simultaneously, the heat exchange between combustion products and evaporator 15 intensifies, which enables producing a sufficient quantity of working water vapor with a small-size evaporator. Water vapor from evaporators 15 is supplied at a temperature of 100-110° C. and a preset flow rate, via valves 16, to pipe coils 17 installed in heating pipes 18.

From cylindrical furnaces 14, fuel combustion products enter heating pipes 18. Flowing down heating pipes 18, fuel combustion products heat the reactor, and the water vapor flowing in pipe coils 17. By adjusting the water vapor flow rate via pipe coils 17 with valves 16, the steam temperature at outlets 19 is maintained within the range of 450-500° C. In doing so, the temperature of water vapor coming out of each pipe coil 17 via outlet 19 is monitored with temperature sensors 20.

Since pipe coils 17 are installed directly in heating pipes 18, the combustion product flow becomes turbulized (a turbulent mode of combustion product flow is established), and as a result, the heat transfer from the flow to pipe coils 17 themselves and to the walls of heating pipes 18 noticeably increases; further from the walls, by convection and emission, the heat flow to reactor 6 also increases.

From heating pipes 18, combustion products come out via pipeline 21 connecting both heating pipes to heating jacket 22. Flowing down heating jacket 22, combustion products additionally heat the reactor.

Combustion products are directed via valve 23 to jacket 24 of cyclone filter 25. This is necessary to maintain the filter's temperature above the condensation temperature of hydrocarbon vapors generated in the rubber waste thermolysis. Otherwise, at a temperature drop, some of hydrocarbon vapors will be condensed in cyclone filter and deposited on filtering element 26; as a result, the filtering element will fail.

In doing so, the temperature in cyclone filter 25 is monitored by readings of temperature sensor 27, and maintained within 350-400° C. by adjusting the combustion product flow rate with valve 23. The combustion products having passed through jacket 24 of filter 25 are supplied to calorifer 28 and cooled to a temperature of 200-250° C. by pumping air through heating chamber 29 with ventilator 30. The combustion product cooling temperature is monitored by readings of temperature sensor 31. The cooled combustion products are extracted from calorifer 28 with exhauster fan 32 to flue gas stack 33. The air heated in the calorifer is supplied, in equal quantities, to heating pipes 18 with ventilator 30 via dampers 34.

This enables utilizing the heat of the combustion products leaving heating jacket 24 at a high temperature (350-400° C.). The fuel consumption rate is reduced due to complete utilization of combustion product heat, and thermal energy emission with combustion products to the environment is prevented, i.e. the energy efficiency of the worn tire recycling process is improved.

With superheated water vapor, heat is entered directly into reactor 6, to the areas of feeding the initial rubber waste having a temperature close to the ambient temperature (the waste fed into the reactor has not warmed up yet).

Supplying superheated water vapor into this area (the reactor zone) ensures a high temperature difference between the steam superheated to 500° C. and cold waste at a temperature of about 30-40° C. And this (high temperature difference) provides high heat flows from steam to waste by convective transfer of thermal energy; as a result, the waste heating accelerates, and their recycling time is reduced.

Rubber waste travels in reactor 6 and is heated in contact with the reactor's hot walls and by convective heat exchange with water vapor supplied into the reactor, by emission from the heating pipes, and by convective heat exchange with the heating pipe surface.

The heating pipes arranged along the axis of each screw enables bringing the heating pipes closer to the rubber waste surface, which improves heat transfer not only by emission, but also by convection. As there is water vapor and hydrocarbon vapors in the reactor, which absorb heat emission, it is necessary to reduce the distance from the heating pipes to the rubber waste surface to reduce the value of such absorption. With a longer distance from the heating pipes to the waste surface, a large part (depending on the distance covered by heat emission) of heat emission will be absorbed by vapor-gas mix (mixture of water vapor and hydrocarbon vapors), therefore the heat flow to the waste itself will decrease, which will result in a longer time for waste decomposition, and thus in a lower efficiency and higher energy consumption for the waste recycling process.

In the process of heating rubber waste in reactor 6 to a temperature of 300-400° C., the rubber waste thermolysis starts, with emission of gaseous products and solid carbon residue. In doing so, the temperature in reactor 6 is monitored by readings of temperature sensor 35 and adjusted by changing the quantity of fuel burnt in burners 13. The gaseous products of waste decomposition mix with water vapor; as a result, vapor-gas mix is generated in reactor 6, and the pressure in the reactor rises above the atmospheric value. High-temperature seals 36 are installed in each section of the reactor to prevent the vapor-gas products from escaping from reactor 6 and to enable rotation of screws 10.

The vapor-gas products produced as a result of rubber waste thermolysis contact with the heating pipes' surface having a high temperature (700-800° C.); as a result, thermal decomposition of high-molecular hydrocarbons proceeds, generating hydrocarbons of a lower mass and soot deposited as a layer on the heating pipes' surface. This soot layer has to be continuously removed from the heating pipes' surface in order to maintain heat transfer from the heating pipes to the waste in the reactor. The soot layer on the surface creates thermal resistance, and the heat flow through this layer decreases; as a result, less thermal energy enters the reactor, and the heating pipes themselves, due to low heat removal, are overheated to a high temperature and burn out as a result, which leads to an emergency (reactor collapse).

Soot is removed from the heating pipes' surface with scrapers 37, which slide on the side surface of heating pipes 18 during the rotation of screw 10, cutting off the soot layer. The soot so cut off falls down by gravity to the layer of rubber waste moved by screws 10.

As a result of thermal decomposition of high-molecular hydrocarbons, the content of valuable low-molecular hydrocarbons in the vapor-gas mix increases, and the content of resinous compounds decreases. Simultaneously, water vapor reacts with soot (carbon) producing hydrogen and carbon oxide.

The entry of hydrogen into reactor 6 results in hydrogenation of unsaturated hydrocarbons contained in the vapor-gas mix, producing valuable saturated hydrocarbons, i.e. the quality of rubber waste thermolysis products increases.

Vapor-gas products from each reactor section are extracted from reactor 6 to cyclone filter 25 via perforated pipes 38 using valves 39.

As a result of waste's travel in the reactor under the action of the screws, solid carbon residue is disintegrated producing fine carbon dust, which goes to the reactor. The extraction of vapor-gas mix from the reactor without cleaning the mix free of dust results in carrying carbon dust away to pipelines and condensation system, so that the pipelines and condensation system become clogged with carbon dust. The area of passage of the pipelines decreases, and the pressure in the reactor increases. Clogging the condensation system with carbon dust leads to poorer heat transfer (the dust layer on the condensation system's surface acts as a heat insulator) and to a failure of the system.

Supplying the vapor-gas mix to cyclone filter 25 reduces the carbon dust escape from the reactor. This happens because the vapor-gas mix passes through filtering element 26 in the form of a heat-resistant carbon cloth bag provided with a shaker. Dust particles deposit on the filtering element's surface, and with the aid of shaker 40 dumped to the lower part of cyclone filter 25, from which they are discharged to storage 41. This carbon is a valuable product close to carbon black with low ash content by its performances.

The vapor-gas mix flow having passed through cyclone filter 25 is supplied by compressor 42 to condenser 43, where as a result of heat exchange with cooling water pumped through the condenser jacket from tower 44 it is cooled to the water vapor condensation temperature, which is monitored by readings of temperature sensor 45.

As a result of the cooling of vapor-gas products, the water vapor and some of the hydrocarbon vapor are condensed producing condensate consisting of water and liquid hydrocarbons. This condensate is supplied from condenser 43 to separator 46 and split into water and liquid hydrocarbons. Water from separator 46 is supplied to storage 47, from which it is returned via filter 48 and valve 49 to evaporator 15 to obtain working water vapor.

Liquid hydrocarbons from separator 46 are supplied to storage 50, from which the necessary quantity of liquid hydrocarbons is supplied via valve 51 to cylindrical furnace 14 and burnt, and the energy is used to obtain working water vapor and to heat reactor 6.

Solid carbon residue is extracted from reactor 6 via outlet 52 with rotary cooling batcher 53 and fed to magnetic separator 54, where magnetic inclusions (steel cord particles) are separated and discharged to storage 55.

From magnetic separator 54, the solid carbon residue cleaned free of metal inclusions is fed to electrostatic separator 56 where a part of ash is separated (inorganic inclusions: oxides of zinc, silicon, iron, calcium etc.)

The flow of solid carbon residue cleaned free of ash is directed from electrostatic separator 56 to storage 57, and inorganic inclusions are directed to storage 58. The said inorganic inclusions contain a large proportion of zinc oxide (depending on the rubber waste type, 20 to 40% wt.), therefore they are a high-quality raw material for zinc oxide production. The zinc oxide content in the said inclusions is several times higher than its content in concentrates for zinc oxide production.

Non-condensable hydrocarbon vapors from condenser 43 are supplied to heating pipes 18 via valve 59, and via dampers 34 installed on each heating pipe, air is supplied from calorifer 28 simultaneously with the supply of non-condensable vapors, adjusting its rate by the damper opening extent. Air is supplied to the heating pipes via dampers 34 with the aid of ventilator 30.

As a result of mixing of air and non-condensable hydrocarbon vapors, a combustible mixture is formed, to be ignited by the burners' flame and burnt. The burning of non-condensable hydrocarbon vapors provides additional energy for heating the rector and reduces the consumption of fuel fed to the burners. This improves the energy efficiency of the recycling process and prevents emission of non-condensable gases to the environment.

The invention is illustrated by the following examples.

Example 1

Shredded rubber waste 5 in the form of chips is fed from storage 1 to bin 2 with gates 3 and 4 closed, at the rate of 100 kg every 6 minutes. The dimensions of the rubber chips are: length l=50 mm, width s=50 mm, and height h=30 mm. In this case, the total flow rate of waste is $G_o$=1000 kg/h. When bin 2 has been filled, gate 3 is opened, and waste in the quantity of 100 kg from bin 2 pours down and is checked by gate 4. After this, gate 3 is closed, gate 4 is opened, and waste pours down to reactor 6 and is uniformly distributed, 50 kg to each section of the reactor. Next, gate 4 is closed. Thus, waste is loaded to reactor 6 batch-wise every 6 minutes.

Simultaneous with the loading of the first batch of waste, gear 8 is set in motion by motor 7 at the speed of 2 rpm. Gear 8 engages first gear 9 connected to first screw 10 and second gear 9 connected to second screw 10. Such connection of the gears with gear 8 in rotation results in screws 10 rotating towards each other. Since one screw has the left-hand belt running, and the other screw has the right-hand belt running, during the screws' rotation towards each other the rubber waste is transported in one direction, i.e. from loading to discharge.

Suppose the outer diameter of each screw 10 is d=0.8 m, and its pitch is l=0.2 m. The screws rotate at the speed of 2 rpm. The length of each screw $L_{1,2}$=6 m.

The speed of the material's axial travel in the screw is $$\upsilon = \frac{n_p \times t}{60 \text{ s}} = \frac{2 \times 0.2 \text{ m}}{60 \text{ s}} = 0.0067 \text{ m/s} \quad (1)$$

where $n_p$=screw's revolutions per minute (assuming 2 rpm for our case); t=screw's pitch (assuming t=0.20 m for our case).

The time of waste travel along a screw 6 m long will be $$\tau_{omx} = \frac{6 \text{ m}}{0.0067 \frac{\text{m}}{\text{s}}} = 896 \text{ s} \quad (2)$$

This time (about 15 minutes) is sufficient for full thermal decomposition of chips of a preset size into gaseous and solid products.

The time of the waste's travel in the reactor is adjusted by changing the speed of motor 7. Simultaneous with the start of the waste's relocation from tank 11 via adjusting valve 12 at the rate of 40 kg/h, fuel is fed to each burner 13 and burnt. Burning in total 80 kg/h of liquid fuel with a specific calorific value of 40,000 kJ/kg in two burners will produce 1600 kg/h of combustion products. Burners 13 are installed in cylindrical furnaces 14, and a combustion product vortex with a high temperature is formed during the fuel burning. As a result, the fuel burns up completely, and the generation of noxious compounds (benz(a)pyrenes etc.) in combustion products is reduced. Simultaneously, the heat exchange between combustion products and evaporator 15 intensifies.

Due to the combustion products' heat exchange, 100 kg/h of water vapor is generated in two evaporators. As a result, the combustion products at the outlet of each cylindrical furnace will have a temperature of 900° C. due to the heat exchange with evaporator 15. Thus, the combustion products are cooled down from 1200° C. to 900° C. This is necessary to avoid burnout of the screw pipes. Simultaneously, thermal energy is utilized for the production of working steam.

Water vapor from evaporators 15 is supplied at a temperature of 100° C. via valves 16, at the rate of 50 kg/h from each evaporator, to each pipe coil 17.

From cylindrical furnaces 14, fuel combustion products at the rate of 800 kg/h from each furnace are fed to each heating pipe 18 at a temperature of 900° C. Flowing down heating pipes 18, the fuel combustion products heat the reactor, and the water vapor flowing in pipe coil 17. The heating is by emission from pipes 18 and by convective heat exchange. Furthermore, 85% of the thermal energy from the heating pipes is transferred to the waste by emission, and 15%, by convective heat exchange.

The amount of heat is determined by the average temperature of the surface of pipes 18 and the average temperature of the waste.

Let us calculate the heat transfer by emission. The specific heat flow is found by the formula $$q_u = C_o \times \varepsilon \left[ \left( \frac{\tilde{T}_T}{100} \right)^4 - \left( \frac{\tilde{T}_{OTX}}{100} \right)^4 \right], \quad (3)$$

where $\tilde{T}_T$=average temperature of a heating pipe wall. In our case, $\tilde{T}_{O2}$=0.5(673 K+973K)=823 K; $\tilde{T}_{OTX}$=average temperature of rubber waste. In our case, $\tilde{T}_{OTX}$=0.5(293K+773K)=533K; $C_o$=emissivity of an absolutely black body, $C_o$=5.67 W/(m²·K⁴); e=steel emissivity factor, e=0.8 (see V. P. Isachenko, V. A. Osipova, A. S. Sukomel. Heat Transfer: College textbook—4$^{th}$ edition—Moscow: Energoisdat, 1981, p. 406, Table 9).

The specific heat flow by emission $q_u^H$ from a heating pipe wall to the waste, on the basis of (3), will be:

$$q_u^H = 5.67 \cdot \times 0.8 \times \left[ \left( \frac{823}{100} \right)^4 - \left( \frac{533}{100} \right)^4 \right] = 17055 \text{ W/m}^2. \quad (4)$$

The heating pipe diameter is $d_{m.H.}$=0.3 m. With the length $L_{m.H.}$=6 m, the side surface area will be S=$\pi d_{m.H.} L_{m.H.}$=3.14×0.3 m×6 m=5.65 m². Therefore, the total heat flow by emission from a heating pipe to the waste will be $$Q_H = q_u^H \times s = 17055 \text{ W/m}^2 \times 5.65 \text{ m}^2 = 96360 \text{ W } (96.4 \text{ kW}). \quad (5)$$

By convective heat exchange, the following amount of thermal energy is transferred to the waste:

$$Q_K = [(Q_H)/0.85] \times 0.15 = [(96.4 \text{ kW})/0.8] \times 0.15 = 17 \text{ kW}.$$

Thus, the total amount of thermal energy transferred from each heating pipe to rubber waste is 96.4 kW+17 kW=113.4 kW.

226.8 kW of thermal energy is transferred from two heating pipes to the waste in the reactor.

This energy, with the heat transferred from the reactor's heating chamber, is sufficient for thermal decomposition of 1000 kg/h of rubber waste.

Adjusting the steam flow rate via each pipe coil 17 with valve 16, it is maintained at 50 kg/h; as a result, the steam temperature at outlet 19 is settled at 450° C. In doing so, the temperature of water vapor coming out of each pipe coil 17 via outlet 19 is monitored with temperature sensors 20.

From heating pipes 18, the combustion products come out via pipeline 21 connecting both heating pipes to heating jacket 22 at a rate of 1600 kg/h and temperature T=500° C. Flowing in heating jacket 22, combustion products additionally heat the reactor.

Combustion products are directed at a rate of 1600 kg/h via valve 23 to jacket 24 of cyclone filter 25. This is necessary to maintain the filter's temperature above the condensation temperature of hydrocarbon vapors generated in the rubber waste thermolysis. In our case, this temperature is T=400° C. Otherwise, at a temperature drop, some of hydrocarbon vapors will be condensed in cyclone filter and deposited on filtering element 26; as a result, the filtering element will fail.

The temperature in cyclone filter 25 is monitored by readings of temperature sensor 27, and maintained at T=400° C. by adjusting the combustion product flow rate with valve 23 so that some of the combustion products, in case of a temperature rise in the filter, is directed to calorifer 28 bypassing the filter. The combustion products having passed through jacket 24 of filter 25 are supplied at a rate of 1600 kg/h to calorifer 28 and cooled to 250° C. by pumping air through heating chamber 29 with ventilator 30.

In this case, the amount of air to be heated will be $$M_A = \frac{G_{C.P.} \times C_{C.P.} \times (T_{IN.P.} - T_{OUT.P.})}{Ca \times (T_{OUT} - T_{IN})} = \quad (6)$$

$$\frac{1600 \text{ kg} \times 1.2 \frac{kJ}{kg \cdot °C.} \times (400° C. - 250° C.)}{3600c \times 1.2 \frac{kJ}{kg \cdot °C.} \times (150° C. - 20° C.)} = 0.52 \frac{kg}{c},$$

where $M_A$=amount of air to be heated, kg/s;
$G_{C.P.}$=combustion products flow rate, 1600 kg/h;
$C_{C.P.}$=specific heat of combustion products, 1.2 kJ/kg° C.;
Ca=specific heat of air, 1.2 kJ/kg° C.;
$T_{IN.P.}$=combustion products temperature at the calorifer inlet, 400° C.;
$T_{OUT.P.}$=combustion products temperature at the calorifer outlet, 250° C.;
$T_{OUT}$=air temperature at the calorifer outlet, 180° C.;
$T_{IN}$=air temperature at the calorifer inlet, 20° C.

This quantity of air is sufficient for complete burning of liquid fuel at a rate of 80 kg/h in two cylindrical furnaces.

In doing so, the combustion product cooling temperature is monitored by readings of temperature sensor 31. The cooled combustion products are extracted from calorifer 28 at a rate of 1600 kg/h with exhauster fan 32 to flue gas stack 33. The air heated in the calorifer is supplied at a rate of 0.26 kg/s with ventilator 30 via damper 34 to one heating pipe 18, and at a rate of 0.26 kg/s, to the other heating pipe.

This enables utilizing the heat of the combustion products leaving heating jacket 24 at a high temperature (400° C.). The fuel consumption rate is reduced due to complete utilization of combustion product heat, and thermal energy emission with combustion products to the environment is prevented, i.e. the energy efficiency of the worn tire recycling process is improved.

With superheated water vapor, heat is entered directly into reactor 6, to the areas of feeding the initial rubber waste having a temperature close to the ambient temperature (the waste fed into the reactor has not warmed up yet).

Supplying superheated water vapor into this area (the reactor zone) ensures a high temperature difference between the steam superheated to 500° C. and cold waste at a temperature of about 20° C. And this (high temperature difference) provides high heat flows from steam to waste by convective transfer of thermal energy; as a result, the waste heating accelerates, and their recycling time is reduced.

Rubber waste travels in reactor 6 and is heated in contact with the reactor's hot walls and by convective heat exchange with water vapor supplied into the reactor, by emission from the heating pipes, and by convective heat exchange with the heating pipe surface.

In the process of heating rubber waste in reactor 6 to a temperature of 400° C., the rubber waste thermolysis starts, with emission of gaseous products and solid carbon residue. In our case, the recycling of 1000 kg/h of rubber waste will produce 40% wt. of hydrocarbon vapors and 60% wt. of solid residue. In doing so, the temperature in reactor 6 is monitored by readings of temperature sensor 35 and adjusted by changing the quantity of fuel burnt in burners 13.

The gaseous products of waste decomposition at a rate of 400 kg/h mix with water vapor (supplied to the reactor at a rate of 100 kg/h); as a result, vapor-gas mix is generated in reactor 6 in the amount of 400 kg/h+100 kg/h=500 kg/h, and the pressure in the reactor rises above the atmospheric value. High-temperature seals 36 are installed in each section of the reactor to prevent the vapor-gas products from escaping from reactor 6 and to enable rotation of screws 10.

The vapor-gas products produced as a result of rubber waste thermolysis contact with the heating pipes' surface having a high temperature; as a result, thermal decomposition of high-molecular hydrocarbons proceeds, generating hydrocarbons of a lower mass and soot deposited as a layer on the heating pipes' surface. In our case, 20% wt. of soot of the hydrocarbon vapor amount will be generated, i.e. 400 kg/h×0.2=80 kg/h. This soot layer has to be continuously removed from the heating pipes' surface in order to maintain heat transfer from the heating pipes to the waste in the reactor. The soot layer on the surface creates thermal resistance, and the heat flow through this layer decreases; as a result, less thermal energy enters the reactor, and the heating pipes themselves, due to low heat removal, are overheated to a high temperature and burn out as a result, which leads to an emergency (reactor collapse).

Soot is removed from the heating pipes' surface with scrapers 37, which slide on the side surface of heating pipes 18 during the rotation of screw 10, cutting off the soot layer. The soot so cut off, in the amount of 80 kg/h, falls down by gravity to the layer of rubber waste moved by screws 10.

As a result of thermal decomposition of high-molecular hydrocarbons, the content of valuable low-molecular hydrocarbons in the vapor-gas mix increases, and the content of resinous compounds decreases. Simultaneously, water vapor reacts with carbon producing hydrogen and carbon oxide. The entry of hydrogen into reactor 6 results in hydrogenation of unsaturated hydrocarbons contained in the vapor-gas mix, producing valuable saturated hydrocarbons, i.e. the quality of rubber waste thermolysis products increases.

Vapor-gas products from each reactor section are extracted from reactor 6 to cyclone filter 25 via perforated pipes 38 using valve 39 at a total rate of 500 kg/h−80 kg/h=420 kg/h (where 80 kg/h is the amount of soot generated).

As a result of waste's travel in the reactor under the action of the screws, solid carbon residue is disintegrated producing fine carbon dust, which goes to the reactor. The extraction of vapor-gas mix from the reactor without cleaning the mix free of dust results in carrying carbon dust away to pipelines and condensation system, so that the pipelines and condensation system become clogged with carbon dust. The area of passage of the pipelines decreases, and the pressure in the reactor increases. Clogging the condensation system with carbon dust leads to poorer heat transfer (the dust layer on the condensation system's surface acts as a heat insulator) and to a failure of the system.

Supplying the vapor-gas mix to cyclone filter 25 reduces the carbon dust escape from the reactor. This happens because the vapor-gas mix passes through filtering element 26 in the form of a heat-resistant carbon cloth bag provided with a shaker. Dust particles deposit on the filtering element's surface, and with the aid of shaker 40 dumped to the lower part of cyclone filter 25, from which they are discharged to storage 41. This carbon is a valuable product close to carbon black with low ash content by its performances.

In our case, the amount of carbon dust carried away from the reactor is 5% wt. of the amount of solid residue generated, i.e. 600 kg/h×0.05=30 kg/h. This carbon dust is retained by the filter and removed to storage 41 at a rate of 30 kg/h.

The vapor-gas mix flow having passed through cyclone filter 25 is supplied by compressor 42 to condenser 43 at a rate of 420 kg/h, where as a result of heat exchange with cooling water pumped through the condenser jacket from tower 44 it is cooled to the water vapor condensation temperature T=100° C., which is monitored by readings of temperature sensor 45.

As a result of the cooling of vapor-gas products, water vapor is condensed in the amount of 82 kg/h, because 18 kg/h of water vapor has been used in the reaction with carbon generating flammable gases (hydrogen and carbon oxide).

Some of the hydrocarbon vapor in the amount of 220 kg/h is condensed generating condensate; as a result, a mix of water and liquid hydrocarbons is generated in the amount of 82 kg/h+220 kg/h=302 kg/h. This condensate is supplied at a rate of 302 kg/h from condenser 43 to separator 46 and split into water and liquid hydrocarbons. Water from separator 46 is supplied at a rate of 82 kg/h to storage 47, from which it is returned via filter 48 and valve 49 to evaporator 15 to obtain working water vapor.

Liquid hydrocarbons from separator 46 are supplied at a rate of 220 kg/h to storage 50, from which the necessary quantity (17 kg/h) of liquid hydrocarbons is supplied via valve 51 to cylindrical furnaces 14 and burnt, and the energy is used to obtain working water vapor and to heat reactor 6.

Solid carbon residue at a rate of 600 kg/h+80 kg/h−12 kg/h−30 kg/h=638 kg/h (30 kg/h of carbon residue has settled in filter 25 as dust, 12 kg/h of carbon has been used for the reaction with water vapor, and 80 kg of carbon has gone to solid products as soot) is extracted from reactor 6 via outlet 52 with rotary cooling batcher 53 and fed to magnetic separator 54, where magnetic inclusions (steel cord particles) in the amount of 50 kg/h are separated and discharged to storage 55.

From magnetic separator 54, the solid carbon residue cleaned free of metal inclusions is fed at a rate of 638 kg/h−50 kg/h=588 kg/h to electrostatic separator 56 where a part of ash is separated (inorganic inclusions: oxides of zinc, silicon, iron, calcium etc.) in the amount of 5% wt., i.e. 588 kg/h×0.05=29 kg/h.

The flow of solid carbon residue is directed at a rate of 588 kg/h−29 kg/h=559 kg/h from electrostatic separator 56 to storage 57, and inorganic inclusions at 29 kg/h are directed to storage 58. The said inorganic inclusions contain a large proportion of zinc oxide (depending on the rubber waste type, 20 to 40% wt.), therefore they are a high-quality raw material for zinc oxide production. The zinc oxide content in the said inclusions is several times higher than its content in concentrates for zinc oxide production.

Thus, the ash content in solid products is reduced from 12% wt. to 7% wt., which results in an improved quality of solid products.

Non-condensable hydrocarbon vapors from condenser 43 are supplied at a rate of 100 kg/h+28 kg/h=128 kg/h to heating pipes 18 (63 kg/h to each heating pipe) via valve 59, and via dampers 34 installed on each heating pipe, air is supplied. Where 28 kg/h is the proportion of carbon oxide generated in the reaction of water vapor with carbon of solid residue. Simultaneous with the supply of non-condensable vapors, air is supplied from calorifer 28 (at a rate of 10 kg of air per 1 kg of non-condensable vapors), i.e. 1280 kg/h. The air amount is adjusted by the extent of opening of dampers 34. Air is supplied to the heating pipes via dampers 34 with the aid of ventilator 30.

As a result of mixing of air and non-condensable hydrocarbon vapors, a combustible mixture is formed, to be ignited by the burners' flame and burnt. The burning of non-condensable hydrocarbon vapors at the rate of 128 kg/h is equivalent to the burning of 63 kg/h of liquid fuel with a specific calorific value of 40,000 kJ/kg provides additional energy for heating the rector and reduces the consumption of fuel fed to the burners from 80 kg/h to 17 kg/h. This improves the energy efficiency of the recycling process and prevents emission of non-condensable gases to the environment.

Example 2

Shredded rubber waste 5 in the form of chips is fed from storage 1 to bin 2 with gates 3 and 4 closed, at the rate of 150 kg every 6 minutes. The dimensions of the rubber chips are: length l=30 mm, width s=50 mm, and height h=20 mm. In this case, the total flow rate of waste is $G_o$=1500 kg/h. When bin 2 has been filled, gate 3 is opened, and waste in the quantity of 150 kg from bin 2 pours down and is checked by gate 4. After this, gate 3 is closed, gate 4 is opened, and waste pours down to reactor 6 and is uniformly distributed, 75 kg to each section of the reactor. Next, gate 4 is closed. Thus, waste is loaded to reactor 6 batch-wise every 6 minutes.

Simultaneous with the loading of the first batch of waste, gear 8 is set in motion by motor 7 at the speed of 3 rpm. Gear 8 engages first gear 9 connected to first screw 10 and second gear 9 connected to second screw 10. Such connection of the gears with gear 8 in rotation results in screws 10 rotating towards each other. Since one screw has the left-hand belt running, and the other screw has the right-hand belt running, during the screws' rotation towards each other the rubber waste is transported in one direction, i.e. from loading to discharge.

Suppose the outer diameter of each screw 10 is d=0.8 m, and its pitch is t=0.2 m. The screws rotate at the speed of 3 rpm. The length of each screw $L_{1,2}=6_M$.

The speed of the material's axial travel in the screw is $$v = \frac{n_p \times t}{60c} = \frac{3 \times 0.2_M}{60c} = 0.01 \text{ m/s} \quad (1)$$

where $n_p$=screw's revolutions per minute (assuming 3 rpm for our case); t=screw's pitch (assuming t=0.20 m for our case).

The time of waste travel along a screw 6 m long will be $$\tau_{omx} = \frac{6 \text{ m}}{0.01 \frac{\text{m}}{\text{s}}} = 600 \text{ s} \quad (2)$$

This time (10 minutes) is sufficient for full thermal decomposition of chips of a preset size into gaseous and solid products.

The time of the waste's travel in the reactor is adjusted by changing the speed of motor 7. Simultaneous with the start of the waste's relocation from tank 11 via adjusting valve 12 at the rate of 60 kg/h, fuel is fed to each burner 13 and burnt. Burning in total 120 kg/h of liquid fuel with a specific calorific value of 40,000 kJ/kg in two burners will produce 2400 kg/h of combustion products. A temperature of 1200° C. is settled in the furnaces. Burners 13 are installed in cylindrical furnaces 14, and a combustion product vortex with a high temperature is formed during the fuel burning. As a result, the fuel burns up completely, and the generation of noxious compounds (benz(a)pyrenes etc.) in combustion products is reduced. Simultaneously, the heat exchange between combustion products and evaporator 15 intensifies.

Due to the combustion products' heat exchange, 100 kg/h of water vapor is generated in two evaporators. As a result, the combustion products at the outlet of each cylindrical furnace will have a temperature of 950° C. due to the heat exchange with evaporator 15. Thus, the combustion products are cooled down from 1200° C. to 950° C. This is necessary to avoid burnout of the screw pipes. Simultaneously, thermal energy is utilized for the production of working steam.

Water vapor from evaporators 15 is supplied at a temperature of 110° C. via valves 16, at the rate of 75 kg/h from each evaporator, to each pipe coil 17.

From cylindrical furnaces 14, fuel combustion products at the rate of 1200 kg/h from each furnace are fed to each heating pipe 18 at a temperature of 950° C. Flowing down heating pipes 18, the fuel combustion products heat the reactor, and the water vapor flowing in pipe coil 17. The heating is by emission from pipes 18 and by convective heat exchange. Furthermore, 85% of the thermal energy from the heating pipes is transferred to the waste by emission, and 15%, by convective heat exchange.

The amount of heat is determined by the average temperature of the surface of pipes 18 and the average temperature of the waste.

Let us calculate the heat transfer by emission. The specific heat flow is found by the formula $$q_u = C_o \times \varepsilon \left[ \left( \frac{\tilde{T}_T}{100} \right)^4 - \left( \frac{\tilde{T}_{OTX}}{100} \right)^4 \right], \quad (3)$$

where $\tilde{T}_T$=average temperature of the heating pipe surface. In our case, $\tilde{T}_T$=0.5(773 K+1073K)=923 K; $\tilde{T}_{OTX}$=average temperature of rubber waste. In our case, $\tilde{T}_{OTX}$=0.5(303K+823K)=563K; $C_o$=emissivity of an absolutely black body, $C_o$=5.67 W/(m²·K⁴); e=steel emissivity factor, e=0.8 (see V. P. Isachenko, V. A. Osipova, A. S. Sukomel. Heat Transfer: College textbook—4$^{th}$ edition—Moscow: Energoisdat, 1981, p. 406, Table 9).

The specific heat flow by emission $q_u^H$ on the basis of (3) will be:

$$q_u^H = 5.67 \cdot \times 0.8 \times \left[ \left( \frac{923}{100} \right)^4 - \left( \frac{563}{100} \right)^4 \right] = 28363 \text{ W/m}^2. \quad (4)$$

The heating pipe diameter is $d_{m.H.}$=0.3 m. With the length $L_{m.H.}$=6 m, the side surface area will be $S=\pi d_{m.H.} L_{m.H.}$=3.14×0.3 m×6 m=5.65 m². Therefore, the total heat flow by emission from a heating pipe to the waste will be $$Q_H = q_u^H \times S = 17055 \text{ W/m}^2 \times 5.65 \text{ m}^2 = 160250 \text{ W} \quad (160.3 \text{ kW}). \quad (5)$$

By convective heat exchange, the following amount of thermal energy is transferred to the waste:

$Q_K$=[($Q_H$)/0.85]×0.15=[(160.3 kW)/0.8]×0.15=30 kW.

Thus, the total amount of thermal energy transferred from each heating pipe to rubber waste is 160.3 kW+30 kW=190.3 kW.

380.6 kW of thermal energy is transferred from two heating pipes to the waste in the reactor.

This energy, with the heat transferred from the reactor's heating chamber, is sufficient for thermal decomposition of 1500 kg/h of rubber waste.

Adjusting the steam flow rate via each pipe coil 17 with valve 16, it is maintained at 75 kg/h; as a result, the steam temperature at outlet 19 is settled at 500° C. In doing so, the temperature of water vapor coming out of each pipe coil 17 via outlet 19 is monitored with temperature sensors 20.

From heating pipes 18, the combustion products come out via pipeline 21 connecting both heating pipes to heating jacket 22 at a rate of 2400 kg/h and temperature T=600° C. Flowing in heating jacket 22, the combustion products additionally heat the reactor.

Combustion products are directed at a rate of 2400 kg/h via valve 23 to jacket 24 of cyclone filter 25. This is necessary to maintain the filter's temperature above the condensation temperature of hydrocarbon vapors generated in the rubber waste thermolysis. In our case, this temperature is T=500° C. Otherwise, at a temperature drop, some of hydrocarbon vapors will be condensed in cyclone filter and deposited on filtering element 26; as a result, the filtering element will fail.

The temperature in cyclone filter 25 is monitored by readings of temperature sensor 27, and maintained at T=500° C. by adjusting the combustion product flow rate with valve 23 so that some of the combustion products, in case of a temperature rise in the filter, is directed to calorifer 28 bypassing the filter.

In our case, this part is 900 kg/h. The combustion products having passed through jacket 24 of filter 25 at the rate of 2400-900 kg/h=1500 kg/h are supplied to calorifer 28 and cooled to a temperature of 250° C. by pumping air through heating chamber 29 with ventilator 30. In doing so, 900 kg/h of combustion products that was not passed through the jacket 24 is also passed through the calorifer.

In this case, the amount of air to be heated will be $$M_A = \frac{G_{C.P.} \times C_{C.P.} \times (T_{IN.P.} - T_{OUT.P.})}{C_a \times (T_{OUT} - T_{IN})} = \quad (6)$$

$$\frac{2400 \text{ kg} \times 1.2 \frac{\text{kJ}}{\text{kg} \cdot ^\circ \text{C.}} \times (500^\circ \text{ C.} - 300^\circ \text{ C.})}{3600 \text{ s} \times 1.2 \frac{\text{kJ}}{\text{kg} \cdot ^\circ \text{C.}} \times (220^\circ \text{ C.} - 20^\circ \text{ C.})} = 0.67 \frac{\text{kg}}{\text{s}},$$

where $M_A$=amount of air to be heated, kg/s;
$G_{C.P.}$=combustion products flow rate, 2400 kg/h;
$C_{C.P.}$=specific heat of combustion products, 1.2 kJ/kg° C.;
Ca=specific heat of air, 1.2 kJ/kg° C.;
$T_{IN.P}$=combustion products temperature at the calorifer inlet; 500° C.;
$T_{OUT.PII}$=combustion products temperature at the calorifer outlet, 250° C.;
$T_{OUT}$—air temperature at the calorifer outlet, 220° C.;
$T_{IN}$=air temperature at the calorifer inlet, 20° C.

This quantity of air is sufficient for complete burning of liquid fuel at a rate of 120 kg/h in two cylindrical furnaces.

In doing so, the combustion product cooling temperature is monitored by readings of temperature sensor 31. The cooled combustion products are extracted from calorifer 28 at a rate of 2400 kg/h with exhauster fan 32 to flue gas stack 33. The air heated in the calorifer is supplied at a rate of 0.335 kg/s with ventilator 30 via damper 34 to one heating pipe 18, and at a rate of 0.335 kg/s, to the other heating pipe.

This enables utilizing the heat of the combustion products leaving heating jacket 24 at a high temperature (500° C.). The fuel consumption rate is reduced due to complete utilization of combustion product heat, and thermal energy emission with combustion products to the environment is prevented, i.e. the energy efficiency of the rubber waste recycling process is improved.

With superheated water vapor, heat is entered directly into reactor 6, to the areas of feeding the initial rubber waste having a temperature close to the ambient temperature (the waste fed into the reactor has not warmed up yet).

Supplying superheated water vapor into this area (the reactor zone) ensures a high temperature difference between the steam superheated to 500° C. and cold waste at a temperature of about 20° C. And this (high temperature difference) provides high heat flows from steam to waste by convective transfer of thermal energy; as a result, the waste heating accelerates, and their recycling time is reduced.

Rubber waste travels in reactor 6 and is heated in contact with the reactor's hot walls and by convective heat exchange with water vapor supplied into the reactor, by emission from the heating pipes, and by convective heat exchange with the heating pipe surface.

In the process of heating rubber waste in reactor 6 to a temperature of 400° C., the rubber waste thermolysis starts, with emission of gaseous products and solid carbon residue. In our case, the recycling of 1500 kg/h of rubber waste will produce 45% wt. of hydrocarbon vapors and 55% wt. of solid residue. In doing so, the temperature in reactor 6 is monitored by readings of temperature sensor 35 and adjusted by changing the quantity of fuel burnt in burners 13.

The gaseous products of waste decomposition at a rate of 675 kg/h mix with water vapor (supplied to the reactor at a rate of 150 kg/h); as a result, vapor-gas mix is generated in reactor 6 in the amount of 675 kg/h+150 kg/h=500825 kg/h, and the pressure in the reactor rises above the atmospheric value. High-temperature seals 36 are installed in each section of the reactor to prevent the vapor-gas products from escaping from reactor 6 and to enable rotation of screws 10.

The vapor-gas products produced as a result of rubber waste thermolysis contact with the heating pipes' surface having a high temperature; as a result, thermal decomposition of high-molecular hydrocarbons proceeds, generating hydrocarbons of a lower mass and soot deposited as a layer on the heating pipes' surface. In our case, 25% wt. of soot of the hydrocarbon vapor amount will be generated, i.e. 625 kg/h×0.25=169 kg/h. This soot layer has to be continuously removed from the heating pipes' surface in order to maintain heat transfer from the heating pipes to the waste in the reactor. The soot layer on the surface creates thermal resistance, and the heat flow through this layer decreases; as a result, less thermal energy enters the reactor, and the heating pipes themselves, due to low heat removal, are overheated to a high temperature and burn out as a result, which leads to an emergency (reactor collapse).

Soot is removed from the heating pipes' surface with scrapers 37, which slide on the side surface of heating pipes 18 during the rotation of screw 10, cutting off the soot layer. The soot so cut off, in the amount of 169 kg/h, falls down by gravity to the layer of rubber waste moved by screws 10.

As this soot was generated by thermal decomposition of hydrocarbon vapors, it actually does not contain ash, and the solid carbon residue of rubber waste hydrolysis contains 12% wt. of ash (inorganic inclusions in the form of oxides of zinc, iron, silicon, calcium etc.). Therefore, mixing 169 kg of soot without ash and 825 kg–100 kg=725 kg of solid carbon residue produces a solid carbon residue with the following ash content:

$$A = \frac{M_{T.O.} \times C_O + M_C \times C_C}{M_O + M_C} = \frac{725 \text{ kg} \times 0.12 + 169 \text{ kg} \times 0.0}{725 \text{ kg} + 169 \text{ kg}} = 0.097, \quad (6)$$

or 9.7% wt. %, where A=ash content;
$M_{T.O.}$=weight of solid residue, 725 kg;
$C_O$=ash content in solid residue, 0.12;
$M_C$=weight of soot, 169 kg;
$C_C$=ash content in soot, 0.0.

It is assumed that the solid products contain 100 kg of steel cord.

Thus, the ash content in solid products of rubber waste decomposition is reduced from 12% wt. to 9.7% wt., and therefore the quality of these products improves.

As a result of thermal decomposition of high-molecular hydrocarbons, the content of valuable low-molecular hydrocarbons in the vapor-gas mix increases, and the content of resinous compounds decreases. Simultaneously, water vapor reacts with carbon producing hydrogen and carbon oxide and dioxide.

$$H_2O + C = H_2 + CO \quad (7)$$

It follows from (7) that as a result of the reaction of water vapor with carbon, 12 kg of carbon is consumed per 18 kg of water vapor.

In our case, 24 kg of carbon and 26 kg of water vapor is consumed, generating 4 kg of hydrogen and 56 kg of carbon oxide.

The entry of hydrogen into reactor 6 results in hydrogenation of unsaturated hydrocarbons contained in the vapor-gas mix, producing valuable saturated hydrocarbons, i.e. the quality of rubber waste thermolysis products increases.

Vapor-gas products from each reactor section are extracted from reactor 6 to cyclone filter 25 via perforated pipes 38 using valve 39 at a total rate of 500 kg/h−80 kg/h=420 kg/h (where 80 kg/h is the amount of soot generated).

As a result of waste's travel in the reactor under the action of the screws, solid carbon residue is disintegrated producing fine carbon dust, which goes to the reactor. The extraction of vapor-gas mix from the reactor without cleaning the mix free of dust results in carrying carbon dust away to pipelines and condensation system, so that the pipelines and condensation system become clogged with carbon dust. The area of passage of the pipelines decreases, and the pressure in the reactor increases. Clogging the condensation system with carbon dust leads to poorer heat transfer (the dust layer on the condensation system's surface acts as a heat insulator) and to a failure of the system.

Supplying the vapor-gas mix to cyclone filter 25 reduces the carbon dust escape from the reactor. This happens because the vapor-gas mix passes through filtering element 26 in the form of a heat-resistant carbon cloth bag provided with a shaker. Dust particles deposit on the filtering element's surface, and with the aid of shaker 40 dumped to the lower part of cyclone filter 25, from which they are discharged to storage 41. This carbon is a valuable product close to carbon black with low ash content by its performances.

In our case, the amount of carbon dust carried away from the reactor is 5% wt. of the amount of solid residue generated, i.e. 725 kg/h×0.04=29 kg/h. This carbon dust is retained by the filter and removed to storage 41 at a rate of 29 kg/h.

The vapor-gas mix flow having passed through cyclone filter 25 is supplied by compressor 42 to condenser 43 at a rate of 456 kg/h+4 kg/h=460 kg/h, where as a result of heat exchange with cooling water pumped through the condenser jacket from cooling tower 44 it is cooled to the water vapor condensation temperature T=100° C., which is monitored by readings of temperature sensor 45. The increase of the amount of vapor-gas mix by 4 kg/h is determined by the reaction of hydrogen ($H_2$) with hydrocarbons in the process of hydrogenation.

As a result of the cooling of vapor-gas products, water vapor is condensed in the amount of 150 kg/h−36 kg/h=114 kg/h, because 36 kg/h of water vapor has been used in the reaction with carbon generating gases (hydrogen and carbon oxide).

Some of the hydrocarbon vapor in the amount of 360 kg/h is condensed generating condensate; as a result, a mix of water and liquid hydrocarbons is generated in the amount of 114 kg/h+360 kg/h=474 kg/h. This condensate is supplied at a rate of 474 kg/h from condenser 43 to separator 46 and split into water and liquid hydrocarbons. Water from separator 46 is supplied at a rate of 114 kg/h to storage 47, from which it is returned via filter 48 and valve 49 to evaporator 15 to obtain working water vapor.

Liquid hydrocarbons from separator 46 are supplied at a rate of 360 kg/h to storage 50, from which 42 kg/h of liquid hydrocarbons is supplied via valve 51 to cylindrical furnaces 14 (30 kg/h to each furnace) and burnt, and the energy is used to obtain working water vapor and to heat reactor 6.

Solid carbon residue is extracted from reactor 6 via outlet 52 with rotary cooling batcher 53 and fed to magnetic separator 54 at a rate of 825 kg/h+169 kg/h−24 kg/h−29 kg/h=941 kg/h. 169 kg/h is the quantity of soot generated from hydrocarbon vapors, 24 kg/h of carbon was consumed in the reaction of water vapor with carbon, and 29 kg/h of carbon dust was carried away from the reactor to cyclone filter 25.

In magnetic separator 54, magnetic inclusions (steel cord particles) in the amount of 100 kg/h are separated and discharged to storage 55.

From magnetic separator 54, the solid carbon residue cleaned free of metal inclusions is fed at a rate of 941 kg/h−100 kg/h=841 kg/h to electrostatic separator 56 where a part of ash is separated (inorganic inclusions: oxides of zinc, iron, silicon, calcium etc.) in the amount of 5% wt., i.e. 841 kg/h×0.05=42 kg/h.

The flow of solid carbon residue is directed at a rate of 841 kg/h−42 kg/h=799 kg/h from electrostatic separator 56 to storage 57, and inorganic inclusions at 42 kg/h are directed to storage 58. The said inorganic inclusions contain a large proportion of zinc oxide (depending on the rubber waste type, 20 to 40% wt.), therefore they are a high-quality raw material for zinc oxide production. The zinc oxide content in the said inclusions is several times higher than its content in concentrates for zinc oxide production.

Thus, the ash content in solid carbon residue is reduced to 9.7% wt.−5.0% wt.=4.7%, wt., which results in an improved quality of solid products, compared to solid products of rubber waste pyrolysis to known technologies, where the ash content is 12-14% wt.

Non-condensable hydrocarbon vapors from condenser 43 are supplied at a rate of 100 kg/h+56 kg/h=156 kg/h to heating pipes 18 (78 kg to each heating pipe) via valve 59, and via dampers 34 installed on each heating pipe, air is supplied from calorifer 28 simultaneous with the supply of non-condensable vapors, adjusting its rate by the damper opening extent, in an amount of 10 kg of air per 1 kg of non-condensable vapors, i.e. air is supplied at a rate of 1560 kg/h (780 kg/h to each heating pipe). Air is supplied to the heating pipes via dampers 34 with the aid of ventilator 30. 56 kg/h is the amount of carbon oxide (CO), which was generated in the reaction of water vapor with carbon, while all of hydrogen was consumed in the hydrogenation process.

As a result of mixing of air and non-condensable hydrocarbon vapors, a combustible mixture is formed, to be ignited by the burners' flame and burnt. The burning of non-condensable hydrocarbon vapors at the rate of 156 kg/h is equivalent to the burning of 78 kg/h of liquid fuel with a specific calorific value of 40,000 kJ/kg provides additional energy for heating the rector and reduces the consumption of fuel fed to the burners from 120 kg/h to 42 kg/h. This improves the energy efficiency of the recycling process and prevents emission of non-condensable gases to the environment.

The claimed device for rubber waste recycling is different from known solutions by its improved values of energy consumption, emissions to the environment, and quality of obtained products.

What is claimed is:

1. A rubber waste recycling device comprising:

a reactor provided with a screw and disposed in a heating chamber, the reactor comprising two similar sections arranged in a horizontal plane and connected in parallel on a side surface;

a thermal decomposition assembly comprising screws with heating pipes installed along each screw's axis, the screws being arranged in each of the two similar sections of the reactor;

plates installed along a full length of each screw in parallel at the angles of an equilateral triangle, the plates being in contact and perpendicular to the side surface of each of the heating pipes;

a pipe coil installed inside each heating pipe, a cylindrical furnace directly connected to one end of each heating pipe and the other end of each heating pipe being connected to an inlet of the heating chamber, the cylindrical furnace being provided with an evaporator and a burner installed at an end of the furnace tangentially to a side surface of the furnace and perpendicularly to an axis of the furnace, each pipe coil's outlet being connected to the reactor;

a condenser having an outlet connected to a separator to separate liquids into hydrocarbons and water, a gas outlet of the condenser being connected to the heating pipes;

the evaporator having an inlet and an outlet, the outlet of the evaporator being connected to an inlet of the coil pipe and the inlet of the evaporator being connected to a water outlet of the separator;

a calorifer comprising a calorifer inlet, a calorifer outlet and a calorifer heating chamber, the calorifer outlet being connected to a flue gas stack, and inlet of the calorifer heating chamber being connected to atmosphere, an outlet of the calorifer heating chamber being connected to each of the heating pipe;

a cyclone filter having a filtering element of a heat-resistant carbon cloth bag with a shaker, and having a heating jacket having an inlet connected to the outlet of the heating chamber and an outlet of the heating jacket connected to the calorifer inlet, an outlet of the cyclone filter being connected to an inlet of the condenser;

a vapor-gas mixture extractor comprising two perforated pipes with a plugged inlet of each of the two perforated pipes, the two perforated pipes being arranged in an upper portion of the reactor, one perforated pipe in each of the two similar sections, outlets of the two perforated piped being connected to an inlet of the cyclone filter;

a solid residue discharge connected to an inlet of a magnetic separator, the magnetic separator having an outlet connected to an electrostatic separator.

* * * * *